United States Patent [19]
Field

[11] 3,758,922
[45] Sept. 18, 1973

[54] SLIDING WEDGE CLEAT
[75] Inventor: Gregory A. Field, Annapolis, Md.
[73] Assignee: Sand R. Associates, Inc., Annapolis, Md.
[22] Filed: Oct. 29, 1971
[21] Appl. No.: 193,877

[52] U.S. Cl. .......................................... 24/115 R
[51] Int. Cl. ............................................ F16g 11/04
[58] Field of Search ................ 24/126 R, 136 R, 24/263 SB, 263 DJ, 126 B, 126 K, 136 K; 339/273 S; 254/73; 279/28; 287/114

[56] References Cited
UNITED STATES PATENTS

| 1,146,801 | 7/1915 | Spies | 24/136 R |
|---|---|---|---|
| 1,141,257 | 6/1915 | Norton | 24/136 R |
| 23,894 | 5/1859 | Allen | 24/136 R |
| 523,273 | 7/1894 | Fouts | 24/136 R |
| 857,121 | 12/1907 | Shryock | 24/136 R |
| 1,806,844 | 5/1931 | Dennis | 24/136 R |
| 2,991,526 | 7/1961 | Kuebler | 24/126 R |
| 3,078,535 | 2/1963 | Hedderich | 24/126 R |

FOREIGN PATENTS OR APPLICATIONS

| 504,915 | 5/1939 | Great Britain | 24/136 R |

Primary Examiner—Bernard A. Gelak
Attorney—Richard C. Sughrue et al.

[57] ABSTRACT

A pair of sliding wedges having oppositely directed parallel frictional gripping surfaces are mounted on a base and slide on inclined wedging surfaces. The wedges are spring biased to closed nip position, but permitted to slide against the bias of the spring to facilitate entry of a line between the opposed frictional gripping surfaces while preventing retrograde movement by the presence of the line within the nip.

4 Claims, 3 Drawing Figures

PATENTED SEP 18 1973                                              3,758,922

SLIDING WEDGE CLEAT

BACKGROUND OF THE INVENTION

1. FIELD OF THE INVENTION

The present invention relates to cleats particularly useful in holding a line of the running rigging of a sailboat by use of a pair of spring biased sliding wedge elements.

2. DESCRIPTION OF THE PRIOR ART

Conventionally, a cam cleat comprises a pair of spring biased cam elements or a single spring biased cam element and an abutment which pivot about an axis and are spring biased into closed nip position to define a line-receiving nip between the elements or between the element and a fixed abutment. The coaction and the spring bias of the elements to closed nip position are such that a line, for instance, a sheet, a halyard, or other component of the running rigging of a sailboat, forced into the nip of the cam cleat against the bias of the spring means, may be moved axially in one direction of the line against the bias but is securely held against retrogressive movement in the axial direction, since in the opposite direction, the nip area or the gap between the cam elements or between the cam element and the abutment reduces the size. A strong frictional grip is achieved since the line is actually squeezed between the cam elements or between the cam element and the abutment under any attempt in retrograde movement.

SUMMARY OF THE INVENTION

The present invention is directed to a wedge cleat which will receive a line and securely hold that line against retrogressive movement in the axial direction between spring biased sliding wedge elements. The present invention is contrasted to the prior art devices where the cam cleats are subject to line slippage due to the small frictional area presented to the line or are subject to cutting the line due to the pinching movement of the cams. In the illustrated embodiment, the present invention consists of a base, a pair of inclined sliding wedge surfaces and a pair of spring biased oppositely facing wedge elements, each angularly mounted to the base for sliding along intersecting planes provided in the inclined sliding wedge surfaces. The side wall line confronting profiles of the sliding wedge elements are parallel and the wedge elements are both relatively displaceable along their sliding wedge surfaces to vary the size of the nip formed between to accommodate lines of different diameters. Springs mounted on the base and contacting the sliding wedge elements bias both sliding wedge elements into a closed nip position with the side wall of the sliding wedge element being characterized by a profile defined by oppositely directed parallel duplicate frictional surfaces. A linear recess or hole extends within each sliding wedge element parallel to the inclined sliding wedge surface and respective pins projecting from a fixed block are received within the recesses to limit and guide linear movement of the sliding wedge elements along the sliding wedge surfaces. Each biasing spring consists of a coil spring linearly positioned parallel to the sliding wedge surfaces, mounted to the base, and abutting each sliding wedge element and preferably concentric with a guide pin to bias the linear moving sliding wedge element.

Thus, accordingly, it is a primary object of the present invention to provide a wedge cleat which accepts a line and holds that line securely against any retrograde movement in the axial direction opposite that from which the line entered the wedge cleat.

Other objects, advantages and novel features of the invention will become apparent from the following detailed description of the invention, when considered in conjunction with the accompanying drawings.

DESCRIPTION OF PREFERRED EMBODIMENTS

Figure 1:
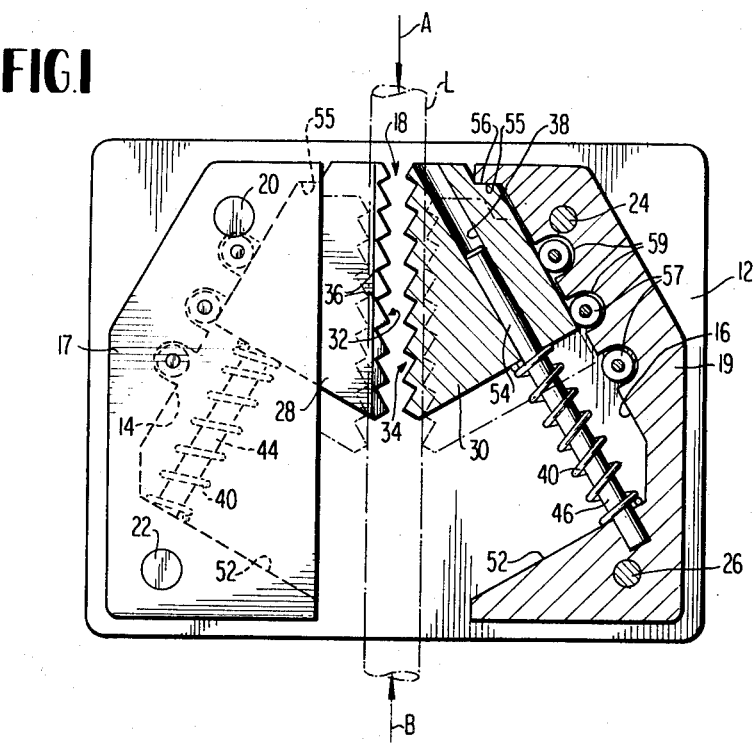
FIG. 1 is a top plan of a wedge cleat forming one embodiment of the present invention.
Figure 2:
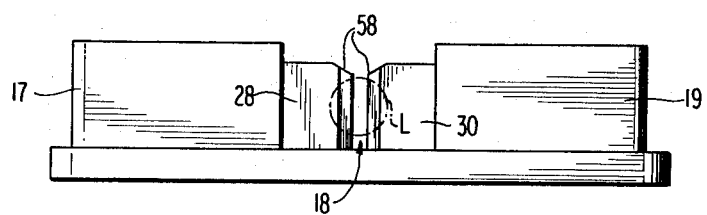
FIG. 2 is a rear elevational view of the wedge cleat of FIG. 1.

Referring to the drawings, the arrangement illustrated in FIGS. 1 and 2 constitutes one embodiment of the present invention formed of wood, plastic, metal or composition material. A base 12 supports blocks 17 and 19 provided with oppositely facing, inclined, sliding wedge guide surfaces 14 and 16 within left and right hand blocks 17 and 19, respectively. Blocks 17 and 19 are mounted upon the base 12 by pins 20, 22, 24 and 26, respectively, allowing the sliding wedge elements 28 and 30 to slide along respective sliding wedge guide surfaces 14 and 16.

The sliding wedge elements cooperate to form a line receiving nip 18 which by parallel axial displacement of the sliding wedge elements, along the sliding wedge surfaces 14 and 16, may be enlarged to accommodate lines of different diameters. Essentially, the nip is formed by the opposed line engaging faces 32 and 34 constituting, in illustrated embodiment, the vertical side walls of sliding wedge elements 28 and 30, respectively; the line engaging faces 32 and 34 being in spaced, parallel confronting relation. The faces 32 and 34 should be parallel to prevent accidental dislodgement of the line and should have serrations 36 or other frictional means, to increase resistance to slippage of a line, shown in dotted lines at L, grasped by the sliding wedge elements within nip 18.

Each sliding wedge element is provided with a cylindrical box or hole 38 which allows pins 44 and 46 to be received thereby, with their after ends fixed to respective blocks 17 and 19. Linear coil springs 40 for respective sliding wedge elements 28 and 30 bias the sliding wedge elements along that plane formed by the sliding wedge surfaces 14 and 16 into a closed nip position. The pins 44 and 46 extend upwardly from bases 52 of blocks 17 and 19, the pins lying parallel to respective sliding wedge surfaces 14 and 16, and their ends 54 are respectively received within holes 38 of the sliding wedge elements 28 and 30 to guide movement of the sliding wedge elements such that the opposed line engaging faces 32 and 34 always remain parallel to each other. It is apparent from viewing FIG. 1 that movement of the sliding wedge elements will act to change the size of the nip between the serrated nip-defining and line engaging faces 32 and 34, with springs 40 biasing the sliding wedge elements toward closed nip position.

Stops 55 within blocks 17 and 19 cooperate with edge recesses 56 within wedge elements 28 and 30 to limit movement of biased wedge elements short of contact with each other. Wedge elements 28 and 30 may ride on antifriction rollers 57 positioned within recesses 59 carried by blocks 17 and 19 to reduce friction between the relatively moving members.

As illustrated in FIGS. 1 and 2, a line is shown in phantom lines as at L. Movement of line L radially towards the nip 18 in the direction of Arrow A, FIG. 1, displaces the sliding wedge elements apart progressively until the line clears the line-engaging faces 32 and 34 and therefore the nip gap of the sliding wedge elements is substantially equal to the diameter of the line. At that point, the line L moves into line-holding position. This is illustrated in FIG. 1 by dotted lines indicating that the sliding wedge elements 28 and 30 are in positions of ultimate displacement with regard to the particular line L due to the forcing of the line into the nip. Movement of the line L in the direction of Arrow A forces the springs 40 to increase tension but permitting the line to enter nip 18.

When positioned in the wedge cleat as shown in FIG. 1, the line may be moved further in the direction of Arrow A, since this has a tendency to increase the nip 18 which grasps the line but any retrograde movement in the direction of Arrow B in this case causes the serrated line-engaging faces 32 and 34 to more closely grip the line and retrogressive movement of the line is prevented.

In order to release the line from the wedge cleat, the line must be moved further in the direction of Arrow A and pulled upwardly from between the line-engaging faces 32 and 34. Opposed beveled corners 58 of the wedge elements assist entry of the line into the nip gap 18.

Figure 3:
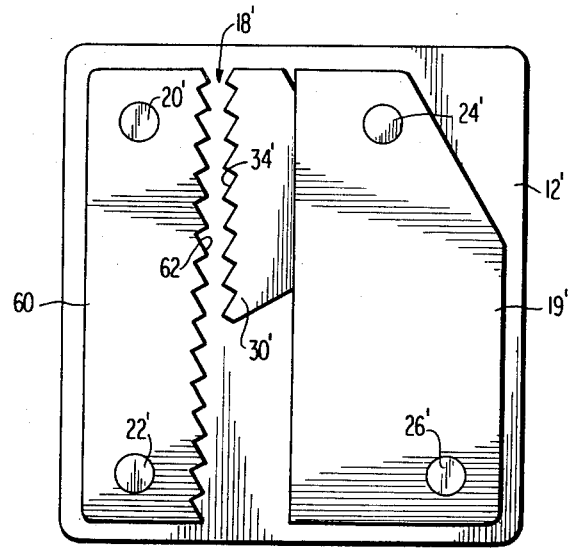
FIG. 3 is a top plan view of an alternate embodiment of the present invention.

Referring to FIG. 3, an alternate embodiment of the invention is illustrated which involves a single sliding wedge element acting in conjunction with a fixed and oppositely facing abutment but in all other respects is constructed along the same lines as the prior described embodiment. In this respect, the components of both embodiments may be formed of light weight metal and include in the embodiment of FIG. 3, a rectangular base 12' and left and right hand fixed blocks 60 and 19' respectively. Block 19' is hollow in similar fashion to block 19 of the embodiment of FIG. 1 and carries a sliding wedge element 30' which is spring biased and constructed in the identical manner to the embodiment of FIG. 1, thus elements 19' and 30' and their manner of mounting to base 12' by means of pins 24' and 26' are identical to the previously described embodiment. The sliding wedge element 30' moves along a plane parallel to the serrated edge 34' of the element to close nip 18' between the sliding wedge element 30' and the fixed block 60. In this respect, the fixed block 60 is generally rectangular in form and is provided with a serrated face 62 confronting the opposed line-engaging serrated face 34' of the sliding wedge element 30' and has similarly configured serrations to that of the wedge element. Pins 20' and 22', fixed abutment block 60 to base 12, and block 60 is approximately the same height as the thickness of the sliding wedge element 30'. While not illustrated, block 30' carries a hole which extends through the same generally parallel to a sliding wedge surface formed wihin the block recess corresponding to surface 16 of block 19 in the illustrated embodiment of FIG. 1, which receives the upper end of a guide pin and further a coil spring similar to coil spring 40 is sandwiched between the base of the block recess and is concentrically mounted on the pin and abuts the inboard end of the sliding wedge element 30'. A line (not shown) enters between the fixed abutment 60 and the sliding wedge element 30' in the same manner as that described with respect to FIGS. 1 and 2, except in this case the abutment 60 is fixed and only the wedge element 30' moves parallel to the plane of the inclined sliding wedge surface of block 19' to enlarge the nip 18' to the extent necessary to permit the line to enter between the spaced, parallel opposed serrated line engaging surfaces 62 and 34' of the abutment 60 and the wedge element 30', respectively. The sliding wedge element 30' moves into the block recess of block 19' to permit entry of the line, whereupon the coil spring maintains a friction grip on the line by the serrated contact surface. While the line may be moved further in the direction of insertion, since this has a tendency also to increase the nip 18' which grasps the line, any retrograde movement in the opposite direction causes the serrated line-engaging faces 62 and 34' to more closely grip the line and retrogressive movement of the line is thereby prevented.

While the illustrated embodiments of the present invention have been described in the preceding manner, it is obvious that modifications and changes can be made to the precise construction herein disclosed. It is, however, intended that the various changes and modifications may be made within the scope of the invention as defined in the appended claims.

What is claimed is:

1. A wedge cleat for releasably holding a yacht working line, said cleat comprising:

a base, opposed blocks mounted on said base and defining a pair of oppositely inclined sliding wedge surfaces, a pair of wedge elements in sliding contact with said sliding wedge surfaces and having parallel confronting faces forming a line-receiving nip therebetween, line engagement means on respective wedge elements permitting said sliding wedge elements to be relatively displaceable from said minimum nip position with said sliding wedge surfaces being configured to effect increased nip gap dimension upon relative movement of said sliding wedge elements, such that a line moved towards said nip in a direction radially of the line and in contact with said line engagement means effects relative displacement between said sliding wedge elements in self-induced fashion to the dimension necessary to receive the line within the nip causing said action, said sliding wedge element carrying a hole whose axis is in alignment with the sliding wedge surface in respective contact therewith, a pin cantilever fixed to each block and having a free end portion extending within a respective hole and being of a diameter slightly less than the diameter of said hole to guide the movement of each element, and a linear coil spring concentrically carried by each pin with its ends respectively compressed between the sliding wedge element and said block for biasing said sliding wedge elements towards closed nip position.

2. A wedge cleat comprising:

a base, an abutment mounted to said base having a serrated face, a block mounted on said base and defining an opposed sliding wedge surface intersecting a plane including the serrated face of said abutment, a sliding wedge element positioned for sliding movement along said sliding wedge surface and having a parallel confronting face wih said serrated abutment face to form a line-receiving nip therebetween, said sliding wedge element including a hole extending within the same whose axis is parallel to the sliding wedge surface, a pin cantilever fixed to said block with a free end received within said hole and being of a diameter slightly less than the diameter of said hole, and a coil spring concentrically carried by said pin and compressed between opposed faces of said block and said sliding wedge element for biasing said sliding wedge element toward closed nip position.

3. A wedge cleat comprising:

a base, opposed blocks mounted on said base, confronting recesses formed within said opposed blocks defining a pair of oppositely inclined sliding wedge surfaces and fixed abutment means at both ends of said sliding wedge surfaces, a pair of wedge elements positioned respectively within said recesses and in sliding contact with the sliding wedge surfaces for movement between said abutments and having opposed, parallel, confronting faces forming a line-receiving nip therebetween, each sliding wedge element including a hole extending within the same whose axis is parallel to said sliding wedge surface, a pin fixed to each block and extending away from one of said abutments in cantilever fashion with a free end received within said hole having a diameter slightly less than said hole, and a coil spring concentrically surrounding each pin and compressed between opposed surfaces of said one abutment and said sliding wedge element for biasing said sliding wedge elements towards closed nip position and line contact means on the ends of said sliding wedge elements remote from said biasing spring, permitting said sliding wedge elements to be relatively displaceable against said bias from said minimum nip position by a line moving towards said nip in a direction radially of the line to effect relative displacement between said sliding wedge elements and said line to a dimension necessary to receive the line within said nip.

4. In a sliding wedge cleat comprising:

a base, at least one block mounted on said base and defining an inclined sliding wedge surface, at least one wedge element in sliding contact with said surface and having a line confronting face to partially form a line receiving nip, line engagement means on said at least one sliding wedge element permitting said at least one sliding wedge element to be relatively displaceable by said line from said minimum nip position with said sliding wedge surface being configured to effect increased nip gap dimension upon relative movement of said at least one sliding wedge element, such that a line moved towards said nip in a direction radially of the line effects relative displacement between said at least one sliding wedge element and said block to the dimension necessary to receive the line within said nip, said at least one sliding wedge element carrying a hole whose axis is in alignment with the sliding wedge surface in respective contact therewith, a pin cantilever fixed to said at least one block and having a free end portion extending within said hole and being of a slightly less diameter than said pin to guide the movement of said at least one element, and a linear coil spring concentrically carried by said pin with its ends respectively in contact with said at least one sliding wedge element and said at least one block for biasing said at least one sliding wedge element towards closed nip position.

* * * * *